(12) United States Patent
Oliver

(10) Patent No.: US 6,999,539 B2
(45) Date of Patent: Feb. 14, 2006

(54) LINEAR DERIVATIVE EQUALIZER, AND ASSOCIATED METHOD, FOR A RADIO COMMUNICATION SYSTEM

(75) Inventor: Jan C. Oliver, Highland Village, TX (US)

(73) Assignee: Nokia Corporation, Espoo (FI)

( * ) Notice: Subject to any disclaimer, the term of this patent is extended or adjusted under 35 U.S.C. 154(b) by 115 days.

(21) Appl. No.: 10/427,087

(22) Filed: May 6, 2003

(65) Prior Publication Data

US 2004/0223562 A1    Nov. 11, 2004

(51) Int. Cl.
*H04B 1/10*    (2006.01)
(52) U.S. Cl. .................................. 375/348; 375/350
(58) Field of Classification Search ............ 375/229, 375/231, 232, 233, 260, 340, 350; 708/323; 333/18, 28 R
See application file for complete search history.

(56) References Cited

U.S. PATENT DOCUMENTS

| | | | |
|---|---|---|---|
| 5,428,834 A | | 6/1995 | Dickerson |
| 5,487,085 A | | 1/1996 | Wong-Lam et al. |
| 5,870,432 A | * | 2/1999 | Kerckhove ............... 375/232 |
| 2002/0181549 A1 | * | 12/2002 | Linnartz et al. ......... 375/142 |

* cited by examiner

*Primary Examiner*—Don N. Vo
(74) *Attorney, Agent, or Firm*—G. Peter Alber, Jr.; Foley & Lardner, LLP

(57) ABSTRACT

Apparatus, and an associated method, for an OFDM communication system. A linear derivative equalizer is provided for a receiving station that receives data communicated upon a channel susceptible to fast fading conditions, caused, for instance, by inter-symbol interference. The linear derivative equalizer removes time-changing distortion and forms an equalized signal that is substantially free of non-static distortion.

15 Claims, 3 Drawing Sheets

LINEAR DERIVATIVE EQUALIZER, AND ASSOCIATED METHOD, FOR A RADIO COMMUNICATION SYSTEM

The present invention relates generally to a manner by which to compensate for non-static distortion, such as inter-symbol interference (ISI) introduced upon data communicated during operation of a communication system that utilizes a frequency domain modulation and access (FDMA) communication scheme. More particularly, the present invention relates to apparatus, and an associated method, by which to facilitate recovery of the data, once received at a receiving station, through the use of a linear derivative equalizer.

The time derivative of the inter-symbol interference is equalized, such that an equalized signal, formed by the linear derivative equalizer, is of characteristics corresponding to the characteristics of a signal transmitted upon a channel that exhibits a stationary impulse response. The linear derivative equalizer mitigates the time-derivative of dispersion and a demodulator is subsequently used to mitigate static dispersion.

BACKGROUND OF THE INVENTION

An endemic need of modern society is the need to communicate data. Data is communicated through the operation of a communication system that is formed, at a minimum, of a set of communication stations, interconnected by way of a communication channel. At least one of the communication stations forms a sending station at which data is sourced. And, at least another of the communication stations forms a receiving station, at which data is terminated. Data sourced at the sending station is communicated upon the communication channel and delivered to the receiving station.

The data is converted at the sending station, if necessary, into a form to permit its communication upon the communication channel to the receiving station. The power levels at which the data is transmitted by the sending station is selected to be great enough to permit its detection at the receiving station, and the data is formatted, and otherwise configured, such that the receiving station that receives the data is able to recreate the informational content thereof.

Communication systems have been developed that operate in many different manners to communicate many different types of data to effectuate communication services thereby. Communication technology advancements shall likely permit these, as well as other, communication systems to be developed further, providing improvements to existing communication systems and permitting new types of communication systems to be implemented.

A radio communication system is an exemplary type of communication system. In a radio communication system, a radio channel is used upon which to communicate data sourced at the sending station to the receiving station. The radio channel is defined upon a radio link that extends between the sending and receiving stations. Because a radio link is utilized upon which to define a radio channel, the need otherwise to utilize a wireline connection interconnecting the sending and receiving stations is obviated. The infrastructure costs associated with initial installation of a radio communication system are generally less than the corresponding costs required to install a corresponding wireline communication system. And, additionally, a radio communication system can be implemented as a mobile communication system. In a mobile communication system, one, or more, of the communication stations operable pursuant to a communication session to effectuate a communication service is permitted mobility.

In an ideal communication system, the values of the data are identical, when recovery operations are performed at the receiving station with corresponding values when transmitted by a sending station. In an actual communication system, though, the data is distorted during its communication upon the communication channel and also during operations thereupon at the receiving station, such as at the so-called front end of the receiving station. When the distortion is significant, the informational content of the data can not accurately be recovered. Communication of data in a radio communication system is sometimes particularly susceptible to distortion.

In a radio communication system, as well as other types of communication systems, fading conditions distort the values of the data. When the data that is communicated forms digital data, the fading exhibited by the data is sometimes caused by inter-symbol interference (ISI). When the fading exhibited on the communication channel is of rapidly changing characteristics, referred to as fast fading conditions, the distortion caused by the fading correspondingly rapidly changes. And, in such fast fading conditions, a channel impulse response (CIR) also is time-variable.

Some radio, as well as other, communication systems utilize a frequency domain modulation and access (FDMA) communication scheme. An FDMA communication scheme is particularly advantageous for use when data must be transmitted at a very high rate or when a complex modulation scheme is utilized. Use of an FDMA scheme reduces problems associated with detection complexity. Each subband, forming portions of a total bandwidth, utilized in an FDMA scheme generally exhibits only flat fading.

On OFDM (orthogonal frequency duplex modulation) scheme is a type of FDMA communication scheme. OFDM schemes typically inverse fast Fourier transform (IFFT) and fast Fourier transform (FFT) at the sending and receiving stations, respectively. For proper operation of the FFT at the receiving station, the impulse response of the channel upon which the OFDM data is transmitted must be substantially constant, at least during the time intervals during which a data burst is operated upon. If the impulse response is changing, compensation can be made by utilizing increased numbers of training symbols, i.e., shortening the frame of data into smaller data groups so that the channel conditions associated with such shortened frame is reduced. However, the throughput of the communication system is reduced through the use of additional training symbols positioned between the shortened frames.

An improved manner is therefore needed to help compensate for inter-symbol interference in an FDMA communication system in which data is communicated upon a communication channel that exhibits a non-constant channel impulse response.

It is in light of this background information related to communications in a communication system susceptible to fading conditions that the significant improvements of the present invention have evolved.

SUMMARY OF THE INVENTION

The present invention, accordingly, advantageously provides apparatus, and an associated method, by which to compensate for non-static distortion, such as inter-symbol interference, introduced upon data communicated during operation of a communication system that utilizes a frequency division multiple access (FDMA) communication scheme.

Through operation of an embodiment of the present invention, a manner is provided for a receiving station by which to facilitate recovery of data, once received thereat, through the use of a linear derivative equalizer (LDE).

The linear derivative equalizer equalizes the time derivative of the inter-symbol interference such that the equalized signal, formed by the linear derivative equalizer, is of characteristics corresponding to the characteristics of a signal transmitted upon a channel that exhibits a stationary channel impulse response. The linear derivative equalizer mitigates the time-derivative of dispersion, and a demodulator is subsequently used to mitigate static dispersion.

Through the use of a linear derivative equalizer, an equalized signal is formed in which the channel impulse response at successive time instances, or intervals, is substantially the same. The equalized signal formed by the derivative equalizer corresponds, as a result, with that of a signal communicated upon a very slowly fading channel, in which inter-symbol interference is present, but the channel impulse response is almost stationary. A signal communicated upon a channel exhibiting such conditions is permitting of recovery of its informational content by an OFDM demodulator.

Additionally, through operation of an embodiment of the present invention, Wiener channel prediction forms a key component of a derivative equalizer, assuming pilot based channel estimation. A novel synthesis technique for a Wiener channel predictor is proposed for correlated dispersive Raleigh fading channels.

When implemented in a cellular communication system, OFDM communication techniques are able to be utilized through which to communicate data pursuant to a communication service. Fast fading conditions that cause time variation of a channel impulse response (CIR) is compensated for through the use of a derivative equalizer. The time derivative of inter-symbol interference is equalized, and an output signal formed thereat is representative of a static or very slowing fading, channel. While inter-symbol interference remains part of the output signal, because the channel impulse is substantially stationary, inter-symbol symbol interference is effectively mitigated pursuant to operation of an OFDM demodulator.

In another aspect of the present invention, a weighting vector is formed by which to weight values of measured channel impulse response values of a channel upon which data is communicated to a receiving station. The weight vector forms a time-invariant vector and is synthesized to be of weighting values, selected for specific signal-to-noise (SNR) ratios and specific values of speed. Channel impulse response values are calculated, formed of a product of weighting values of the vector and measured channel impulse response values. A vector representation, for any time instant within an interval is thereby formed. The calculated vector formation of the channel impulse response, calculated using the weighting vector, defines the channel conditions upon which the data is communicated to the receiving station. The values of the data, when delivered to the receiving station, are also known at the receiving station. Such values of the received data together with the values of the channel impulse response are used to postulate a linear operator, or matrix H, forming a linear derivative equalizer. The matrix H is converted into Toeplitz form.

When the received data is provided to the linear derivative equalizer, the equalizer equalizes the time derivative of the inter-symbol interference that forms part of the received data. The equalized signal is provided then an OFDM receiver whereat OFDM demodulation operations are performed. And, once the data is demodulated, the data is applied to a decoder whereat decoding operations are performed.

The advantages of use of an OFDM communication scheme are thereby provided without problems associated with conventional OFDM communication schemes when the channel conditions upon which data is communicated exhibits fast fading, such as that associated with inter-symbol interference.

In these and other aspects, therefore, apparatus, and an associated method, is provided for a communication system in which data is communicated to a receiving station. The data is communicated to the receiving station on a communication link susceptible to distortion. Recovery of the data, communicated pursuant to an FDM (Frequency Division Multiplexed) communication scheme is facilitated. A derivative equalizer is adapted to receive indications of the data, once delivered to the receiving station. The derivative equalizer equalizes a time-derivative of the distortion. And, the derivative equalizer forms an equalized signal substantially free of non-static distortion. The equalized signal is thereafter operated upon to recover the informational content of the data.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
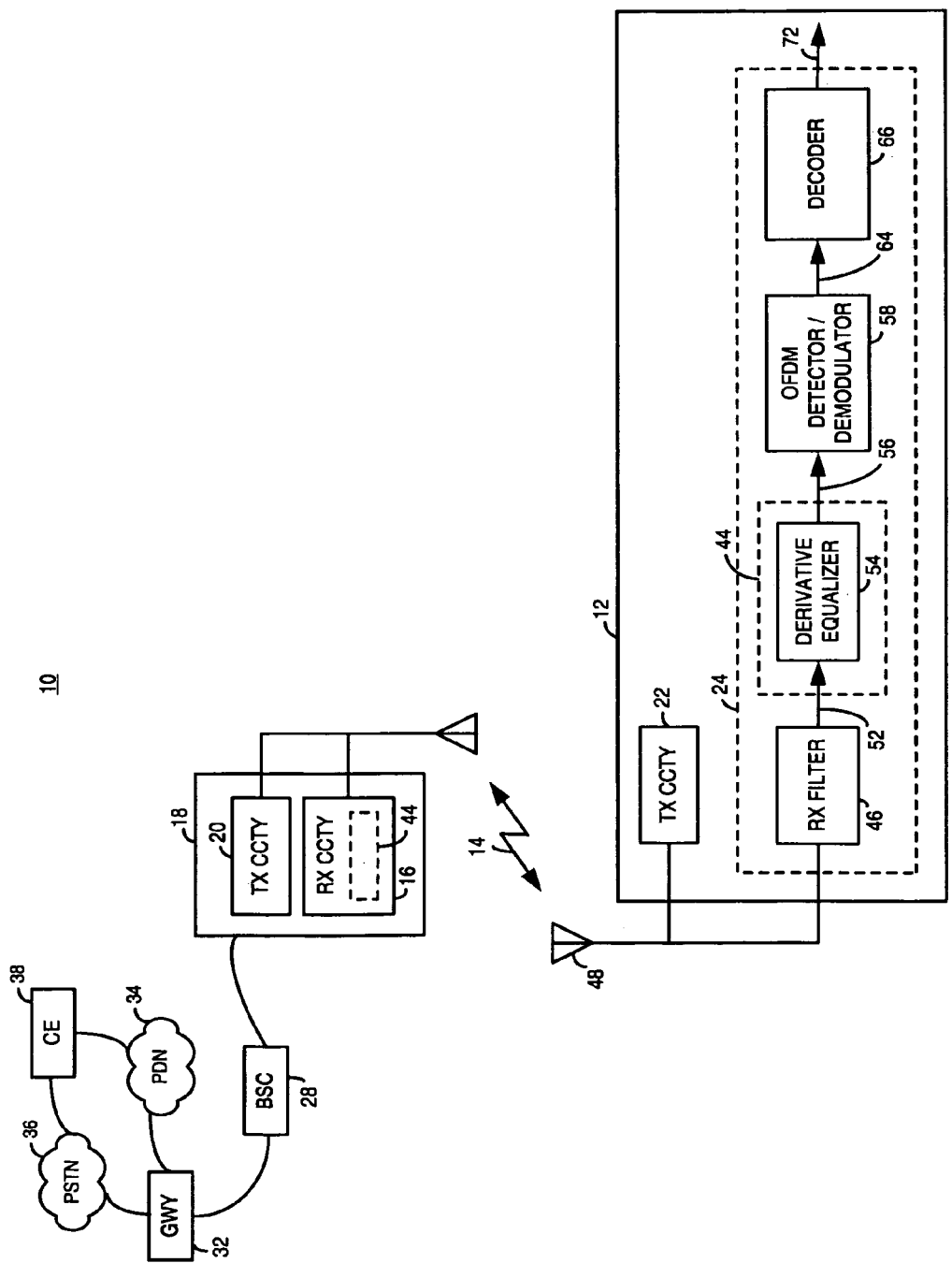
FIG. 1 illustrates a functional block diagram of a radio communication system in which an embodiment of the present invention is operable.

Referring first to FIG. 1, a radio communication system forms a mobile communication system that permits communications with mobile stations, of which the mobile station 12 is exemplary. In the exemplary implementation shown in the Figure, the radio communication system forms a terrestrial cellular communication system, operable generally pursuant to a digital cellular communication operating standard. The communication system, forming a cellular communication system, for instance, is representative of a GSM (Global System for Mobile Communications) system, such as a GSM system that provides for GPRS (General Packet Radio Service) or EDGE (Enhanced Data for GSM Evolution), each of which provides for data communications. The communication system is also representative of cellular communication systems constructed pursuant to other cellular communication standards, such as code-division, multiple-access (CDMA) operating standards, including a CDMA 2000 operating standard.

While the following description shall describe exemplary operation of an embodiment of the present invention with respect to an implementation in which the invention is embodied in a cellular communication system that provides for data communications, the present invention is analogously also operable in other types of communication systems. More generally, the communication system 10 is representative of any data communication system in which data is communicated upon a communication channel susceptible to fast fading conditions, caused, for instance, by inter-symbol interference.

The mobile station 12 communicates by way of communication channels defined upon a radio link 14 formed between the mobile station and a network part of the communication system. Data originated at the mobile station is communicated to the network part by way of uplink channels defined upon the radio link. And, data originated at the network part for delivery to the mobile station is communicated thereto by way of downlink channels defined upon the radio link. Two-way communication of data is thereby effectuable between the mobile station and the network part.

Uplink data sent by the mobile station upon uplink channels to the network part are detected by receive circuitry 16 of a base transceiver station (BTS) 18. The base transceiver circuitry also includes transmit circuitry 20 that operates to transmit downlink data upon downlink channels to the mobile station. Analogously, downlink data sent by the transmit circuitry 20 is communicated upon downlink channels to receive circuitry 22 of the mobile station. The mobile station, also forming a transceiver, also includes transmit circuitry 24 that transmits the uplink data.

The base transceiver station is, in turn, coupled to a base station controller (BSC) 28. The base station controller provides control functions for controlling, amongst other things, operation of the base transceiver station. The base station controller, in turn, is coupled to a radio gateway (GWY) 32. The gateway forms a gateway between a radio access network, of which the base station controller and base transceiver station form portions and other parts of the communication system. Here, the gateway is connected to a packet data network (PDN) 34 and a public-switched, telephonic network (PSTN) 36. And, a correspondent entity (CE) 38 is coupled to the networks 34 and 36. The correspondent entity is representative of any communication device or station that is connectable to either of the networks. The correspondent entity, for example, forms a data server that forms the ultimate source of data that is to be communicated to the mobile station pursuant to a communication service. And, the correspondent entity is also representative of an ultimate destination of data sourced at the mobile station and communicated to the network part and routed therethrough to the correspondent entity.

In an ideal communication system, the values of data, when delivered to a destination, such as delivery of downlink data to the mobile station or delivery of uplink data to the base transceiver station are identical to corresponding values of the data when transmitted by an originating device. In an actual communication system, however, the values of the data are distorted during their communication such that the values of the data, when delivered to a destination and operated upon, differ in values with the corresponding values of the as-transmitted data. The amounts of inter-symbol interference are rapidly changeable, and the communication channel upon which the data is communicated is referred to as a channel susceptible to fast fading conditions.

The communication system utilizes an OFDM communication scheme that facilitates reduced complexity operation when transmitting data at high data rates, e.g., such as when higher order modulation schemes. However, conventional OFDM communication schemes do not operate well during fast fading conditions. Conventional use of IFFT (inverse fast Fourier transform) and FFT (fast Fourier transform) devices at communication pairs do not operate effectively when the data is communicated upon channels that exhibit fast fading conditions.

The receive circuitry 24 of the mobile station and the receive circuitry 16 of the base transceiver station 18 include apparatus, shown generally at 44, of an embodiment of the present invention. The functions performed by the apparatus 44 embodied at the respective receive circuitries 16 and 24 are analogous. The apparatus 44 transforms the channel impulse response that defines the channel 14 through the equalization of the time derivative of inter-symbol interference introduced thereon. The channel impulse response is transformed such that the channel impulse response is substantially stationary.

Operation is described with respect to the apparatus embodied at the mobile station. The apparatus 44 embodied at the base transceiver station operates analogously. The receive circuitry of the mobile station is shown to include a receive filter 46 to which electrical representations of the received data, transduced into electrical form by the antenna 48 are applied. The receive filter filters the electrical representations of the data applied thereto and forms first-filtered data on the line 52. The filtered data formed on the line 52 is applied to a derivative equalizer 54 of the apparatus 46. The derivative equalizer in the exemplary implementation forms a linear derivative equalizer that equalizes the time derivative of inter-symbol interference that forms part of the filtered receive signal applied thereto. And, the derivative equalizer generates an equalized signal on the line 56 that is applied to an OFDM detector/demodulator 58. The equalized signal generated by the derivative equalizer contains inter-symbol interference, but is free of non-static inter-symbol interference.

The OFDM demodulator demodulates the filtered, equalized data provided thereto and forms demodulated values on the line 64. The OFDM detector/demodulator effectively demodulates the equalized data provided thereto, even if the equalized data includes significant levels of static, inter-symbol interference. The demodulated signals generated on the line 64 are applied to a decoder 66. The decoder 66 operates to decode the demodulated data applied thereto and to form decoded values on the line 72.

Figure 2:
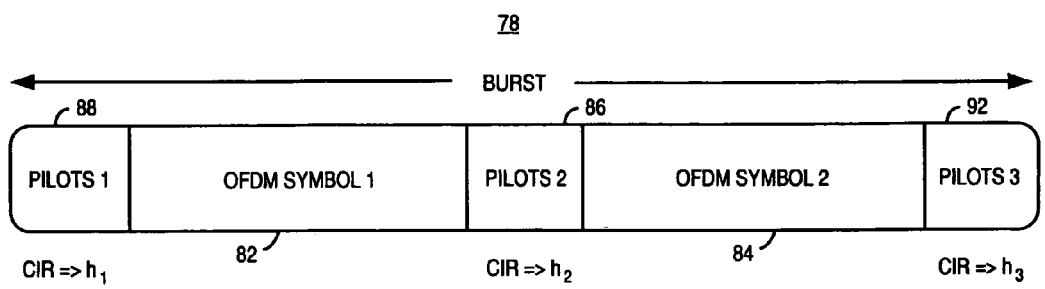
FIG. 2 illustrates the burst structure of an exemplary data burst generated during operation of the radio communication system shown in FIG. 1.

The derivative equalizer makes use of a channel impulse response (CIR) over an entire data burst, at any time instant of the burst. FIG. 2 illustrates a representation, shown generally at 78, of an exemplary data burst generated during operation of the communication system 10 shown in FIG. 1. The burst 78 includes a pair of OFDM symbols, designated at 82 and 84, separated by a short burst of pilot symbols 86. Pilot symbol bursts 88 and 92 are positioned at opposing ends of the burst. The pilot symbol bursts are of known values and, when received at a receiving station, are conventionally operated upon to obtain information of the channel conditions upon which the pilot symbol bursts are transmitted. And, by obtaining such information regarding the channel conditions of the pilots symbols during the pilot symbol bursts, such as the bursts 86, 88, and 92, the communication channel conditions during communication of the informational, OFDM symbol bursts 82 and 84 are assumed to correspond with those of the channel conditions during transmission of the pilot symbol bursts.

This assumption requires that the rate of fading upon the channel being slow, compared to the duration of the burst. However, when the fading is fast, this assumption might well be inaccurate. The channel conditions are represented by channel impulse response values, h. Determined channel impulse responses during the pilot symbol bursts 88, 86, and 92 are represented by $h_1$, $h_2$, and $h_3$. During fast fading conditions, the values h measured responsive to the separate pilot symbol bursts 86, 88, and 92 are dissimilar. Use of a channel impulse response value that is measured during one of the pilot symbol bursts and used subsequently to indicate the channel conditions upon which the OFDM symbol is transmitted does not provide for accurate recovery of the informational content of the OFDM symbol. Use of the derivative equalizer 54 of an embodiment of the present invention renders the separate values of the channel impulse h to be equal to one another. Thereby the channel is rendered to be substantially static over the length of the burst 78.

When the burst is of short length, the sampling rate does not conform to the channel multi-path delays as such delays are random. And, when the transmission and receive filters span multiple samples, each tap of $h_i$ is a function of, i.e., is correlated with all of the taps of $h_1$, $h_2$, and $h_3$. A linear predictor for each tap j of $h_i$ is represented by:

$$hi(j)=w^T_{1,ij}h1+w^T_{2,ij}+w^T_{3,ij}jh3=w^T_{i,j}h$$

Given the transmit and receive filters and Raleigh fading, the weight vector w is time-invariant. That is, the vector w is not adaptive. And, the weight vector $w_{ij}$ is synthesized.

A system of over-determined linear equation a=Bw for the weight vector $w_{i,j}$ by requiring a fixed vector $w_{i,j}$ to minimize the error over multiple bursts in a Least Square sense. The over-determined linear equation is representable as:

$$\begin{pmatrix} h_i^{k=1}(j) \\ h_i^{k=2}(j) \\ h_i^{k=3}(j) \\ \vdots \\ h_i^{k=N}(j) \end{pmatrix} = \begin{pmatrix} h^T_{1,k=1} & h^T_{2,k=1} & h^T_{3,k=1} \\ h^T_{1,k=2} & h^T_{2,k=2} & h^T_{3,k=2} \\ h^T_{1,k=3} & h^T_{2,k=3} & h^T_{3,k=3} \\ \vdots & \vdots & \vdots \\ h^T_{1,k=N} & h^T_{2,k=N} & h^T_{3,k=N} \end{pmatrix} w_{i,j}$$

Wherein k indices the burst number. The weight $w_{i,j}$ is given by $w_{i,j}=\text{pinv}(B)a$. The process is repeated for all i,j at a specific signal-to-noise ratio (SNR) and at a specific speed. The vector $w_{i,j}$ so-determined, works over a wide range of mobile speeds and SNR values.

An estimate of the channel at any point in time, denoted at $h_i$, a model is created, based upon sufficient statistics for the time-domain form of the received model, r=hd in on OFDM system under fast fading as follows:

$$\begin{pmatrix} r[1] \\ r[2] \\ r[3] \\ \vdots \\ r[P] \end{pmatrix} = \begin{pmatrix} h_1(0) & 0 & \cdots & \cdots & \cdots & 0 \\ h_2(1) & h_2(0) & 0 & \cdots & \cdots & 0 \\ h_3(2) & h_3(1) & h_3(0) & 0 & \cdots & 0 \\ \vdots & \vdots & \vdots & \vdots & \vdots & \vdots \\ 0 & \cdots & h_P(3) & h_P(2) & h_P(1) & h_P(0) \end{pmatrix} \begin{pmatrix} d[1] \\ d[2] \\ d[3] \\ \vdots \\ d[P] \end{pmatrix}$$

Where d is an unknown time domain, transmitted sequence. The linear derivative equalizer, formed of the derivative equalizer 54 (shown in FIG. 1), transforms the system so that the channel impulse response matrix H is Toeplitz form. And, the linear derivative equalizer forms a linear operator, or matrix $H_{lde}$ such that a new received model $z=H_{toeplitz} d$ given by:

$$H_{LDE}r=z=H_{LDE}Hd=H_{Toeplitz}d$$

Where $H_{toeplitz}$ is a Toeplitz matrix, with all rows containing the causal form of the channel impulse response at the start of the burst $H_1$. In deriving $H_{lde}$, the inversion of H is required. If the values of H are deficient, without additional filtering, a pseudo-inverse operation is performed. Alternately, a minimum phase, transforming pre-filter is synthesized, based upon $h_1$ and the entire burst is filtered. The linear dependence between the columns H is removed as this linear operation restores the rank of H to that of a full rank matrix.

Figure 3A:
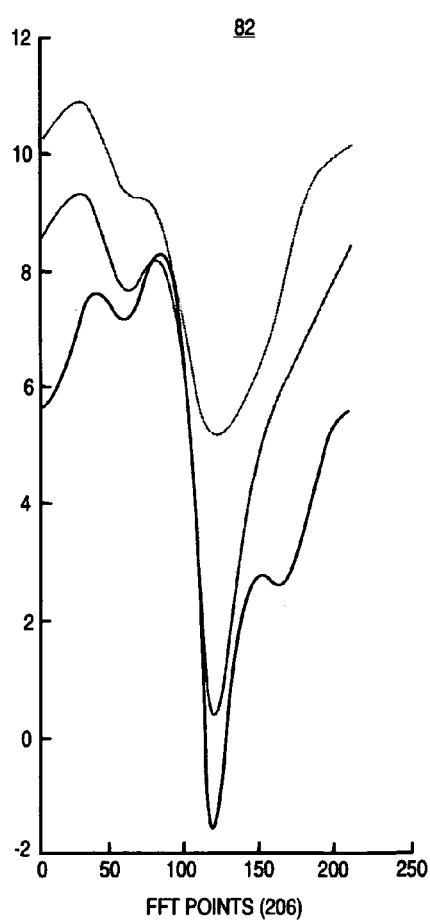
FIG. 3 illustrates a graphical representation showing plots of channel impulse response samples at pilot positions, before, and after, application to a linear derivative equalizer of an embodiment of the present invention.
Figure 3B:
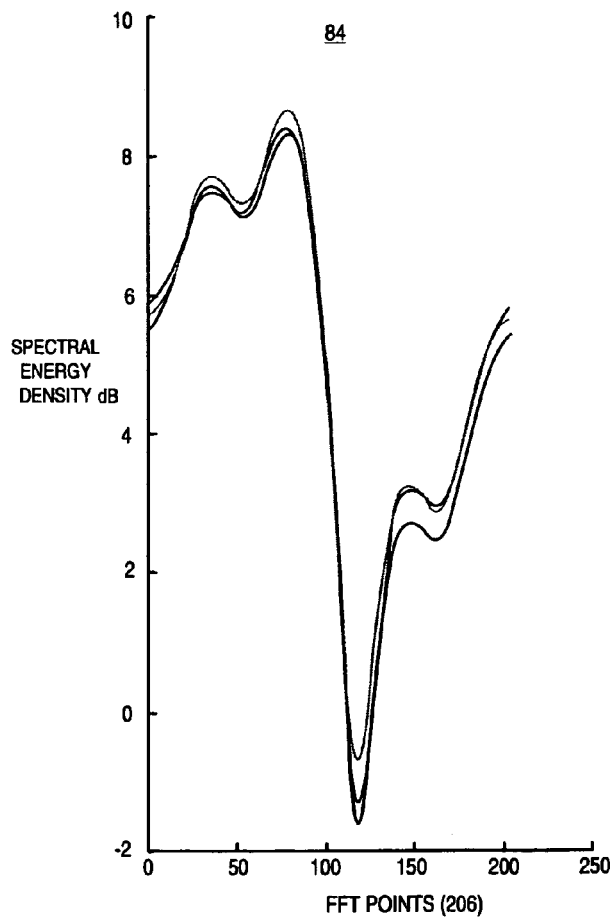

FIG. 3 illustrates a representation of channel impulse response samples, measured at pilot positions, before, and subsequent to, operations performed thereupon by the linear derivative equalizer of an embodiment of the present invention. The plot 82 represents the spectral energy density of data received at a receiving station, prior to application to a linear derivative equalizer. And, the plot 84 is representative of the data values subsequent to operation thereupon by the linear derivative equalizer. Analysis indicates that fast fading is mitigated for OFDM receivers through the use of the linear derivative equalizer. In one implementation, the linear derivative equalizer is switchingly connected, or selectably disabled, to be able to be used, when needed, to mitigated, time-varying inter-symbol interference.

Figure 4:
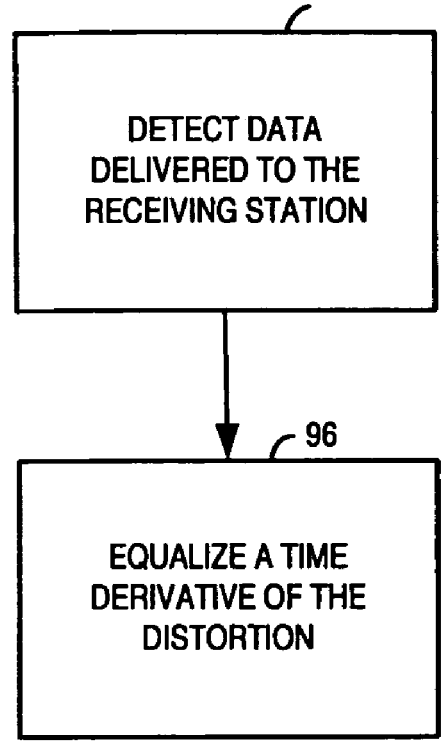
FIG. 4 illustrates a method flow diagram listing the method steps of the method of operation of an embodiment of the present invention.

FIG. 4 illustrates a method flow diagram, shown generally at 92, of the method of operation of an embodiment of the present invention. The method facilitates recovery of data communicated to a receiving station upon a communication link susceptible to distortion, such as inter-symbol interference that causes fast fading conditions to be exhibited upon the communication link. First, and as indicated by the block 94, the data is detected, once delivered to the receiving station. The data is received as received data, formed of transmitted data together with distortion introduced thereon. Then, and as indicated by the block 96, a time-derivative of the distortion is equalized. Thereby, an equalized signal is formed, substantially free of non-static distortion. The equalized signal is thereafter applied to an OFDM detector/demodulator whereat demodulation operations are performed thereon.

The previous descriptions are of preferred examples for implementing the invention, and the scope of the invention should not necessarily be limited by this description. The scope of the present invention is defined by the following claims:

We claim:

1. Apparatus for a communication system in which data is communicated to a receiving station on a communication link susceptible to distortion, said apparatus for facilitating recovery of the data, communicated pursuant to a FDM (Frequency Division Multiplexing) communication scheme, said apparatus comprising:

a derivative equalizer adapted to receive indications of values of the data, once delivered to the receiving station, said derivative equalizer including a linear predictor for forming a channel estimate of the communication link, the channel estimate comprising values of a channel impulse response, the values of the channel impulse response forming a weighted sequence formed of measured channel impulse response values multiplied together with time-invariant weighting values, the time-invariant weighting values selected responsive to a selected level of signal-to-noise ratio of the data, once received to the receiving station, said derivative equalizer for equalizing a time-derivative of the distortion and to form an equalized signal substantially free of non-static distortion.

2. The apparatus of claim 1 wherein the distortion comprises inter-symbol interference and wherein said derivative equalizer equalizes a time-derivative of the inter-symbol interference, the equalized signal substantially free of non-static inter-symbol interference.

3. The apparatus of claim 1 wherein the data communicated to the receiving station comprises a sequence of data values, and wherein said derivative equalizer equalizes the distortion introduced upon any of the data values of the sequence of which the data is formed.

4. The apparatus of claim 1 wherein the communication system comprises a mobile communication system, and wherein the time-invariant weighting values are selected responsive to a selected level of at least relative speed exhibited in the mobile communication system.

5. The apparatus of claim 1 wherein the time-invariant weighting values form a weighting vector of dimensions related to data sampling times.

6. The apparatus of claim 5 wherein the weighting vector comprises a Toeplitz-form matrix.

7. The apparatus of claim 1 wherein the equalized signal formed by said derivative equalizer is of characteristics of a communication signal, communicated upon a slow fading channel that exhibits dispersion.

8. The apparatus of claim 1 further comprising a detector coupled to said derivative equalizer, said detector for demodulating the equalized signal formed by said derivative equalizer.

9. The apparatus of claim 8 wherein said derivative equalizer is coupled to receive the data, once filtered at the receiving station, and represented in the frequency domain.

10. A method of communicating in a communication system in which data is communicated to a receiving station on a communication link susceptible to distortion, said method for facilitating recovery of the data, communicated pursuant to an FDM (Frequency Division Multiplexed) communication scheme, said method comprising:

detecting the data, once delivered to the receiving station, as receive data, the receive data formed of transmitted data together with distortion introduced thereon;

forming a channel estimate of the communication link, the channel estimate comprising values of a channel impulse response, the values of the channel impulse response forming a weighted sequence formed of measured channel impulse response values multiplied together with time in variant weighting values, the time-invariant weighting values selected responsive to a selected level of signal-to-noise of the data, once received at the receiving station; and equalizing a time-derivative of the distortion, thereby to form an equalized signal, substantially free of non-static distortion.

11. The method of claim 10 further comprising the operation of:

demodulating the equalized signal by an FDM demodulator to form a demodulated signal.

12. The method of claim 11 further comprising the operation of decoding the demodulated signal.

13. The method of claim 10 wherein the distortion introduced upon the transmitted data comprises inter-symbol interference and wherein the equalized signal formed responsive to said operation of equalizing is substantially free of non-static inter-symbol interference.

14. The method of claim 10 wherein the receive data, of which the time-derivative of the distortion thereof is equalized during said operation of equalizing is represented in a frequency domain.

15. Apparatus for a receiving station operable in a communication system in which a receive data burst, formed of data symbols and inter-symbol interference introduced thereon during communication to the receiving station, is received at the receiving station, said apparatus for facilitating data recovery, said apparatus comprising:

a linear derivative equalizer adapted to receive values of the received data burst, said linear derivative equalizer for equalizing time derivatives of the inter-symbol interference that forms part of the received data and for forming an equalized signal substantially free of non-static distortion.

* * * * *